March 2, 1948.  J. P. WILSON ET AL  2,437,216
APPARATUS FOR MIXING DRY AND LIQUID MATERIALS
AND LOADING INTO CONTAINERS
Filed March 15, 1944  10 Sheets—Sheet 10
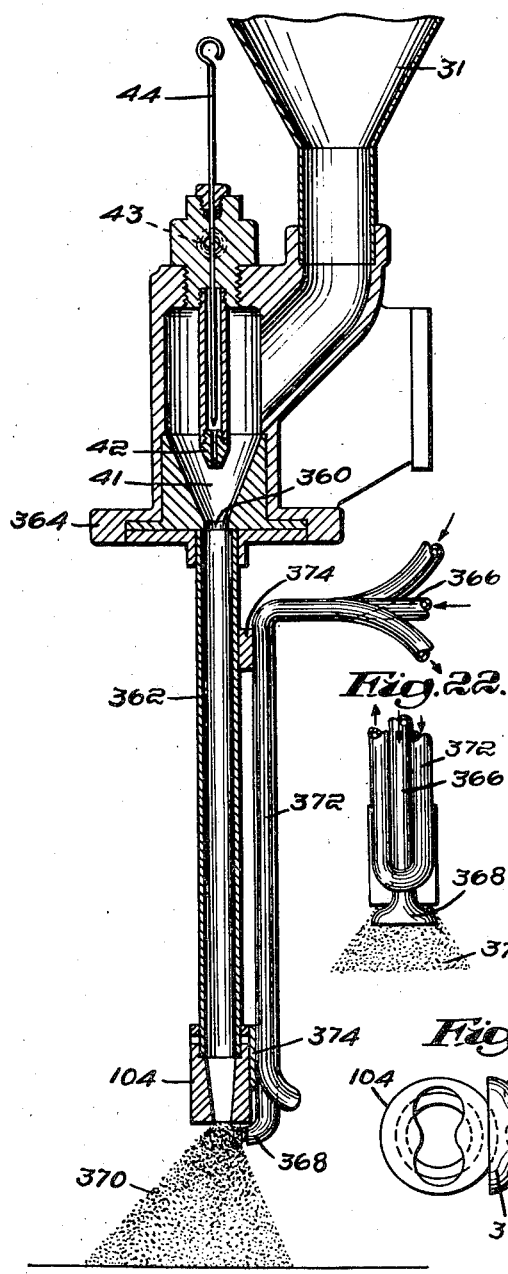
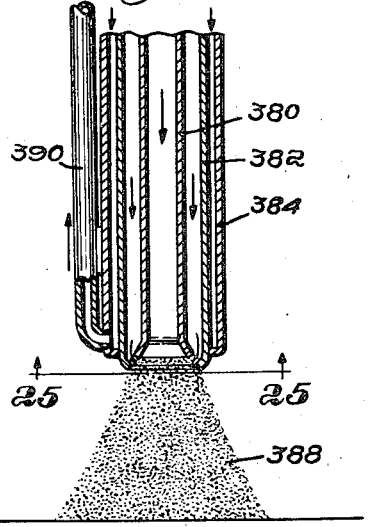
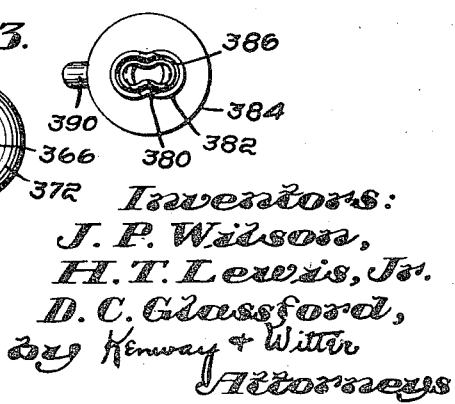
Inventors:
J. P. Wilson,
H. T. Lewis, Jr.
D. C. Glassford,
by Kenway & Witter
Attorneys Patented Mar. 2, 1948

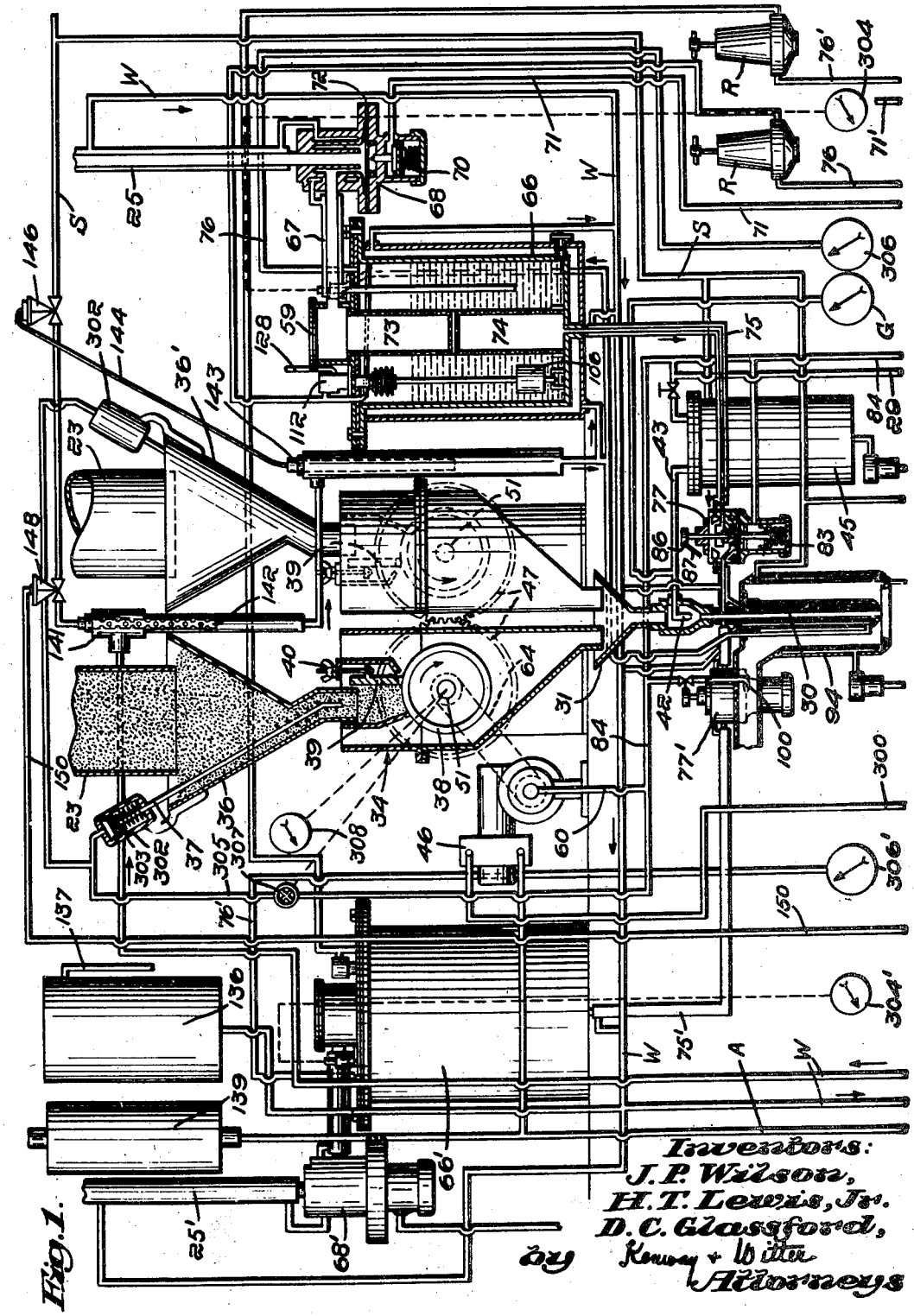

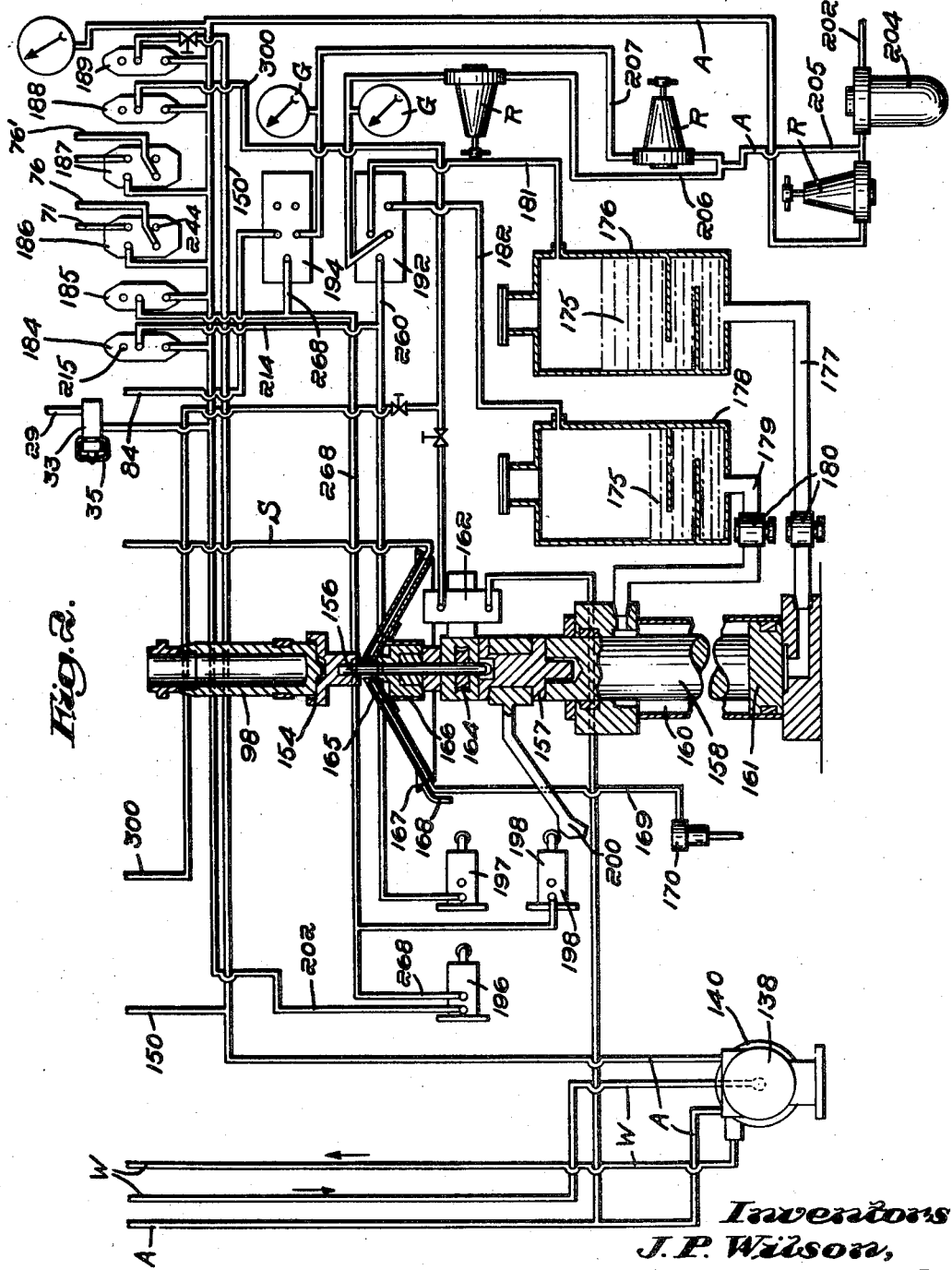

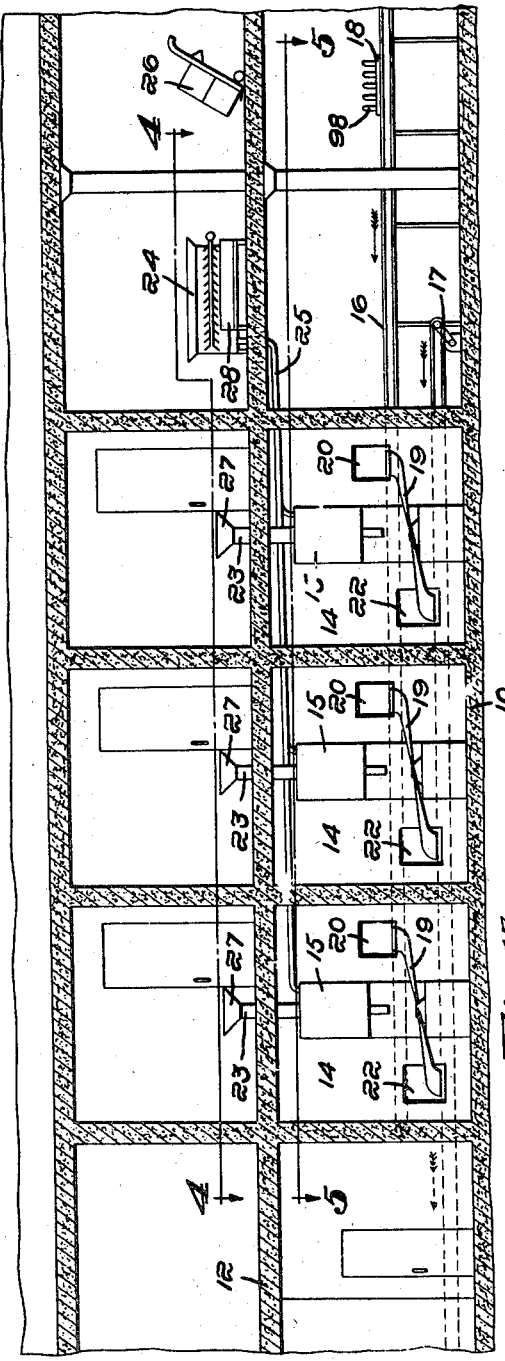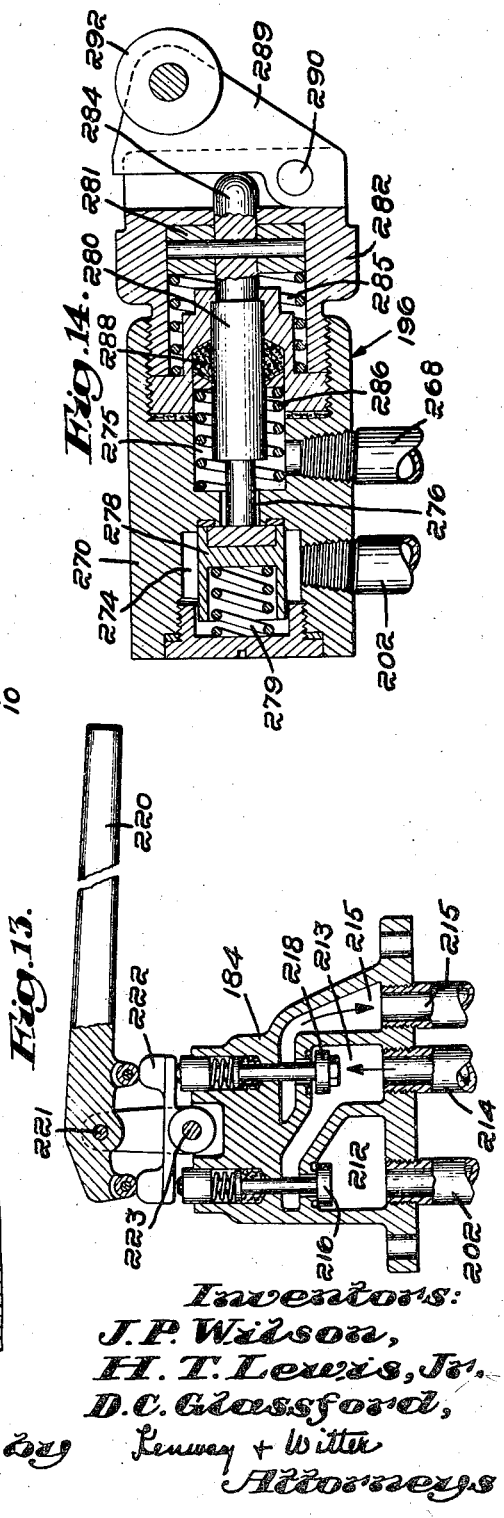

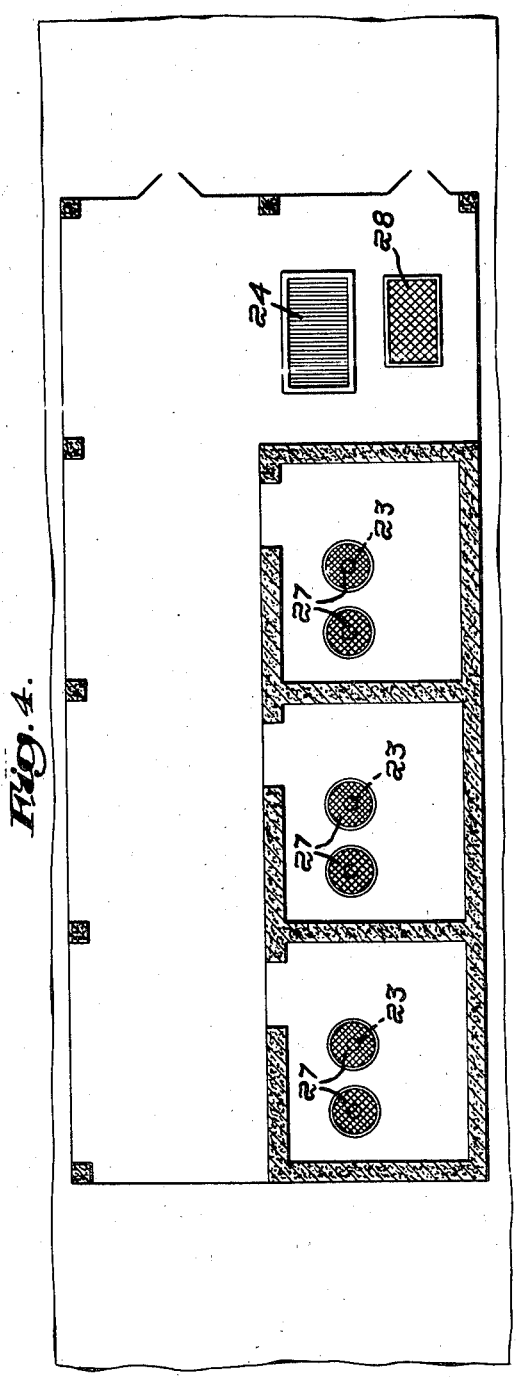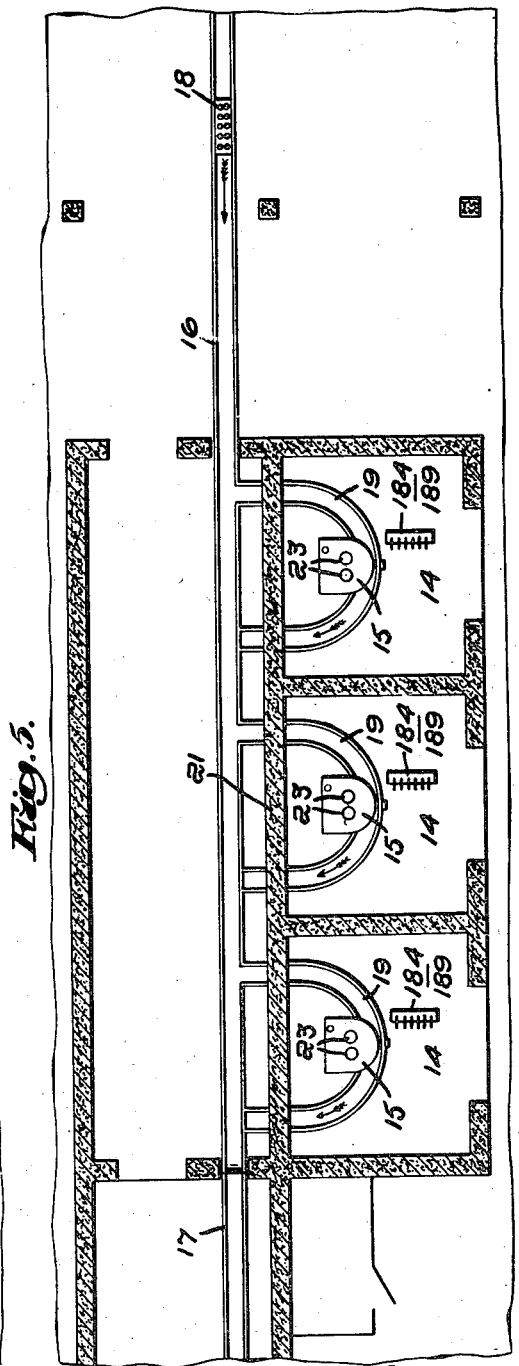

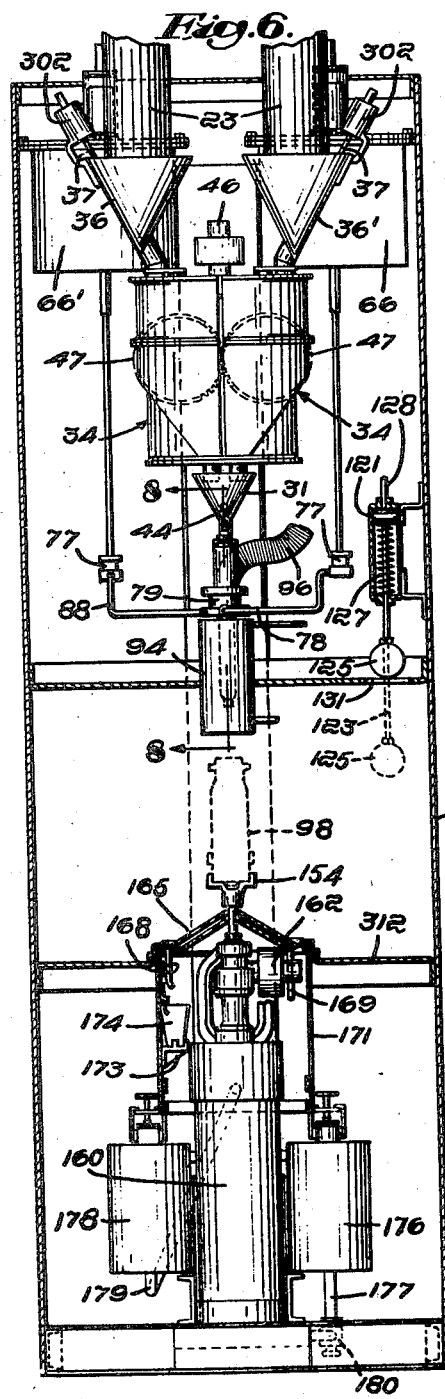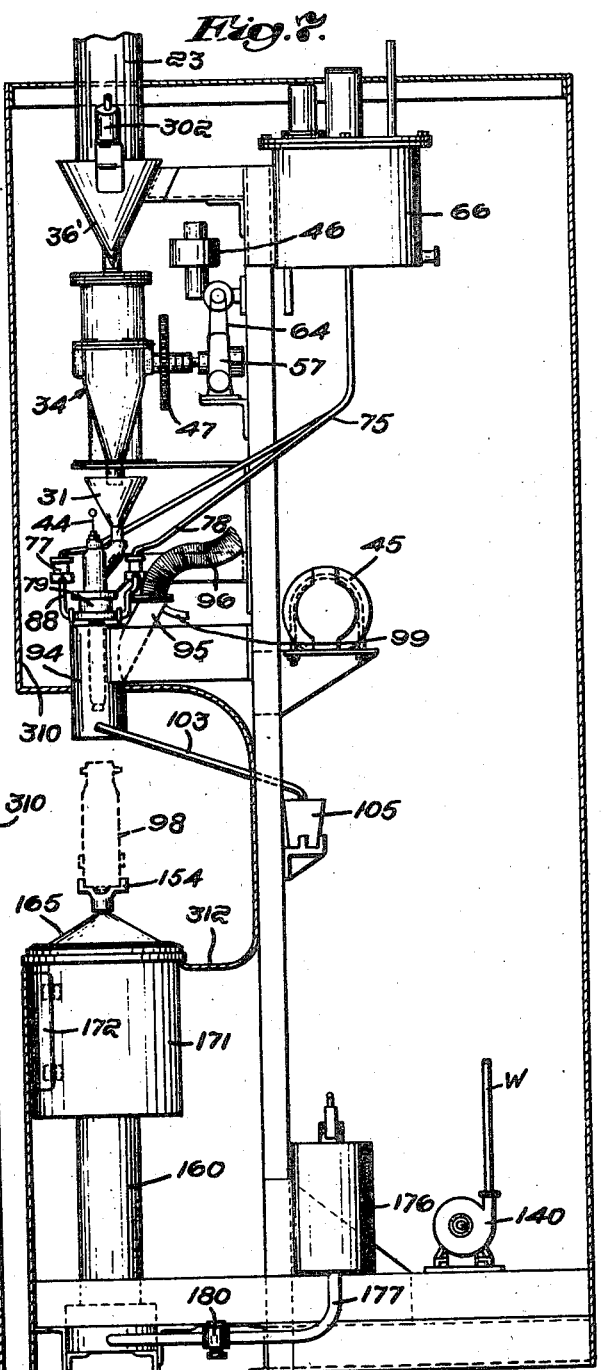

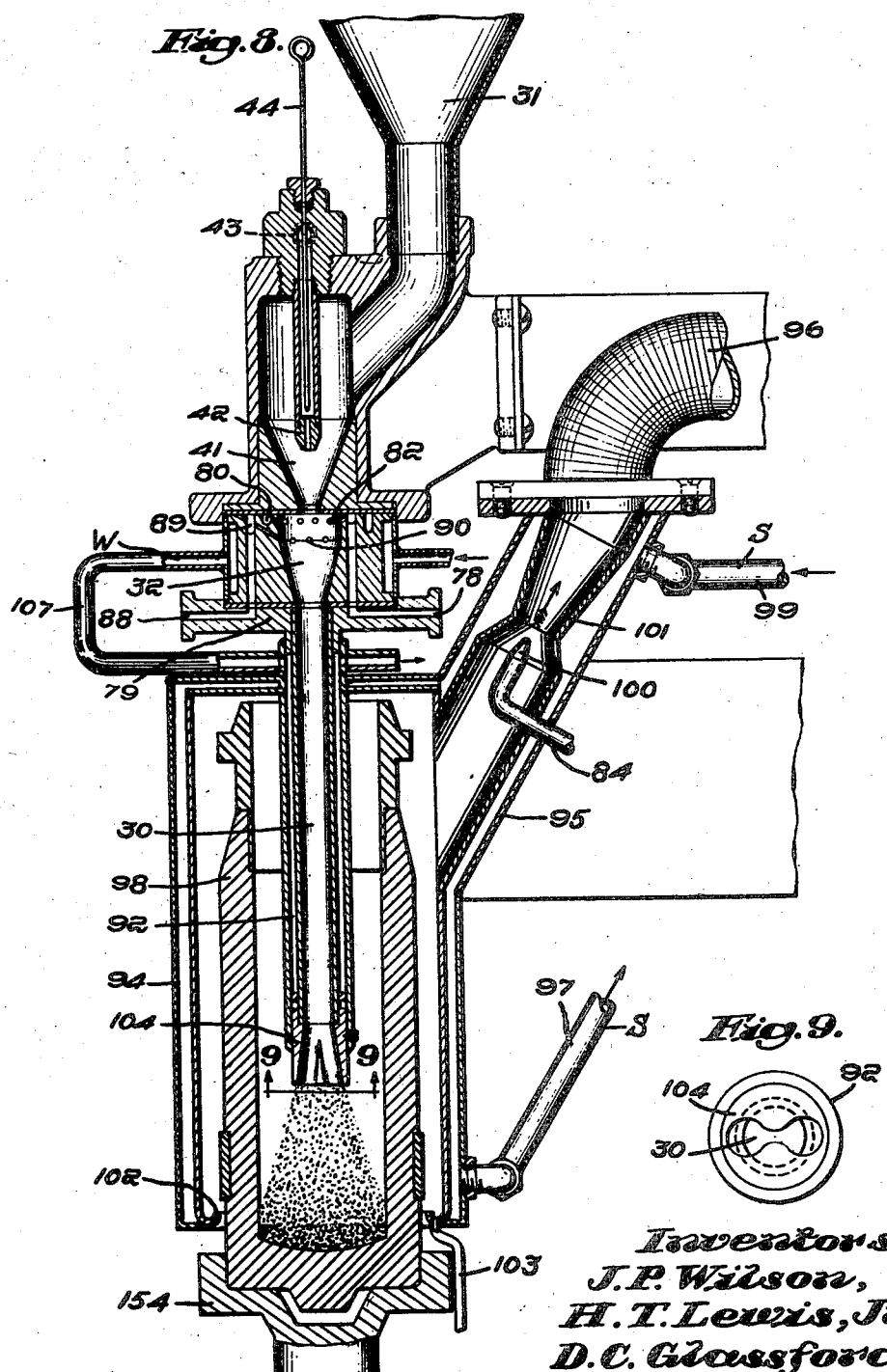

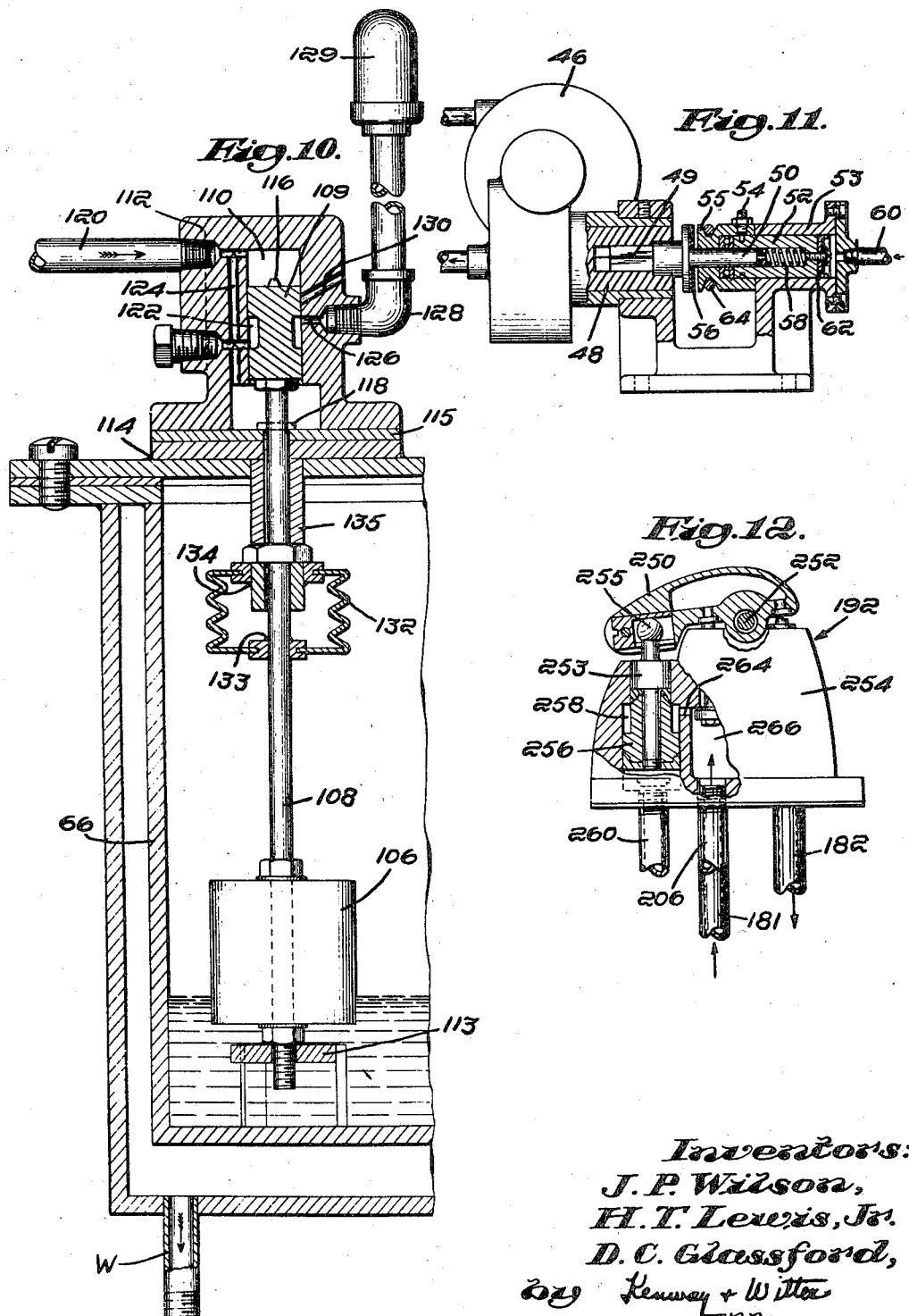

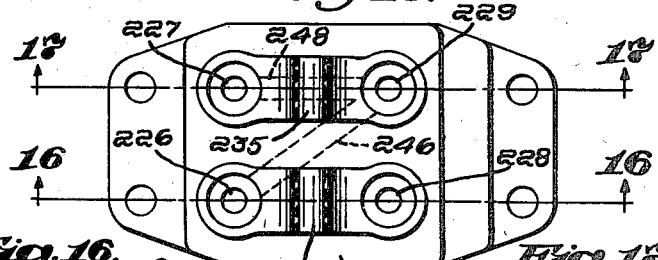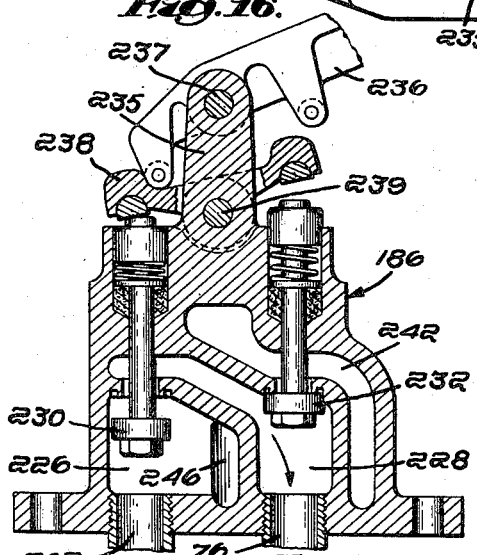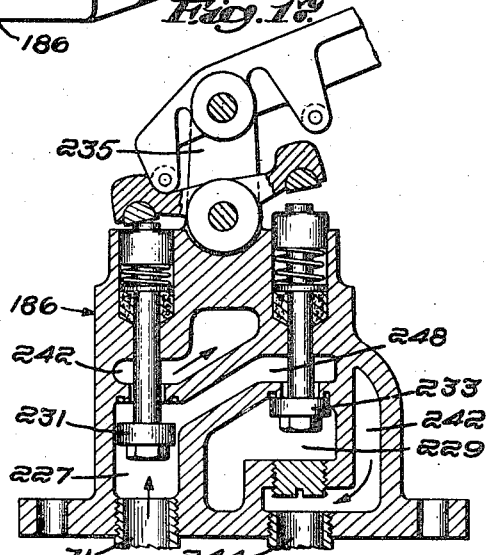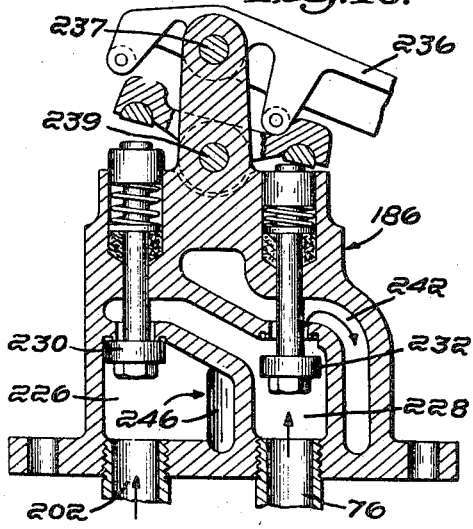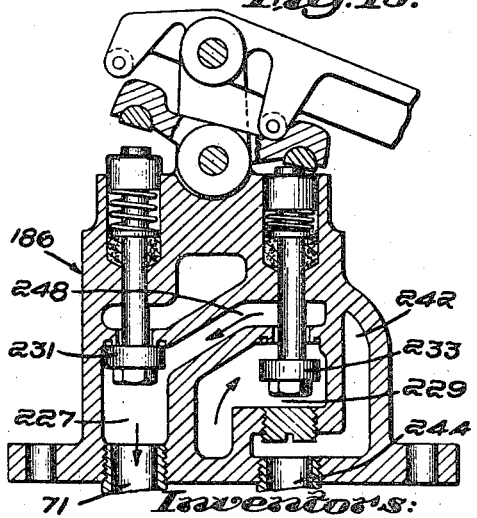

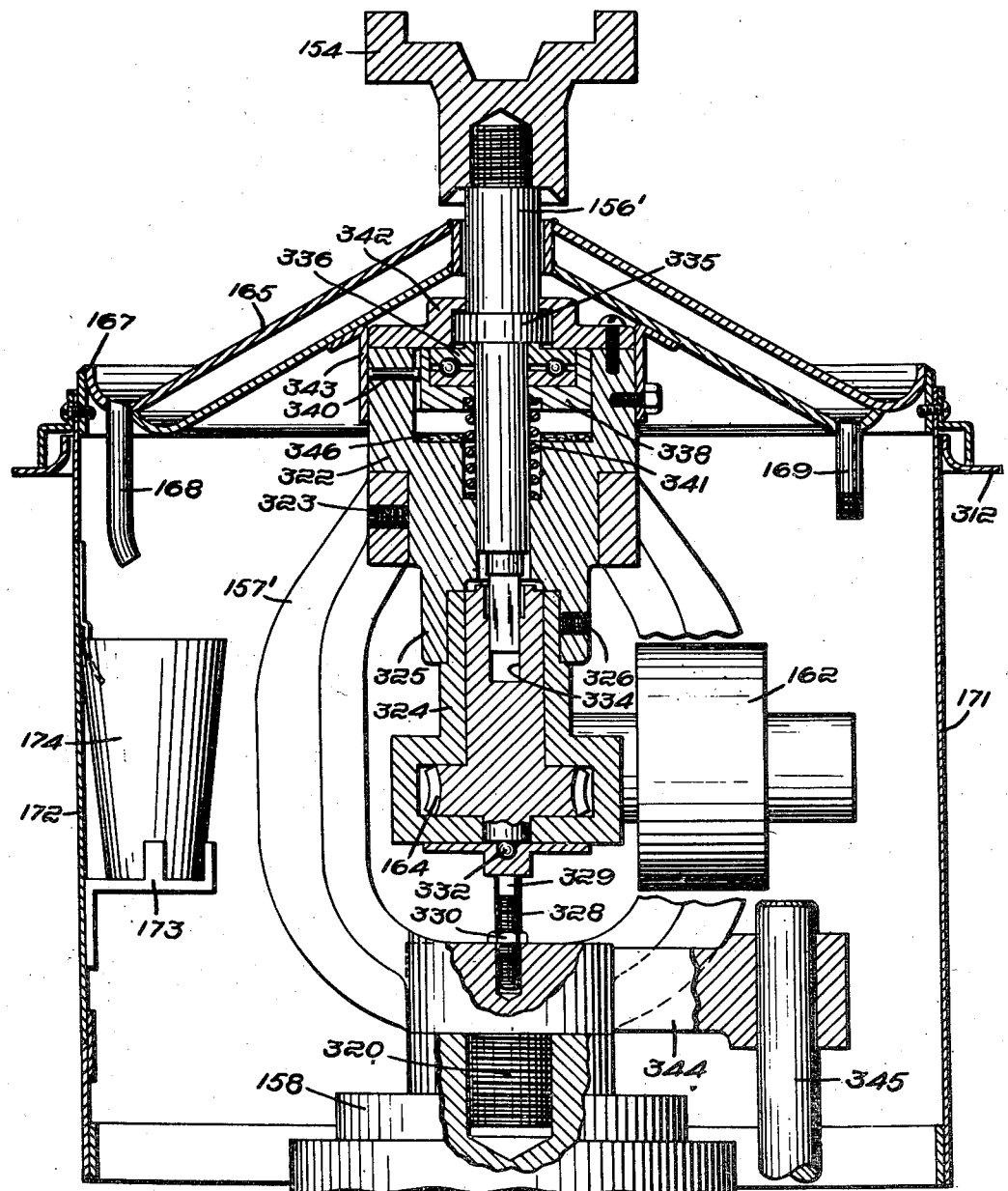

2,437,216

UNITED STATES PATENT OFFICE 2,437,216

APPARATUS FOR MIXING DRY AND LIQUID MATERIALS AND LOADING INTO CONTAINERS

Jack P. Wilson, Ardmore, Herbert T. Lewis, Jr., Philadelphia, and Donald C. Glassford, Merion Station, Pa., assignors to Proctor & Schwartz, Inc., Philadelphia, Pa., a corporation of Pennsylvania Application March 15, 1944, Serial No. 526,546

13 Claims. (Cl. 86—31)

This invention relates to apparatus for effecting the predetermined mixing of dry and liquid ingredients continuously by fluid pressure action and for effecting the continuous loading or filling of the resulting mixture into casings or the like. Mixtures containing dry and liquid ingredients have heretofore been formed in batches by measuring out predetermined amounts of the ingredients and then laboriously stirring and agitating the same for long periods of time during which further liquid ingredients may be periodically added to produce the desired result. Such procedure not only consumes much time and labor but, more important, it does not assure a uniform mixture. This latter is particularly true when attempts are made to mix dry material of different sizes of grain and different densities or specific gravities with liquids of different specific gravities and viscosities. For example, the filler for dry batteries comprises a mixture of clay, carbon dust and liquid electrolyte. The first two are mixed for hours to secure the greatest possible uniformity of distribution and the mixing is thereafter continued while increments of the electrolyte are periodically added. Not only is the process extremely laborious and time consuming but, furthermore, there is no definite assurance of uniformity in the mixture, this last being of great importance since the life of a dry cell is directly proportional to the uniformity of the filling mixture. Numerous other examples, such as the mixing of abrasives of different grain sizes together with bonding liquids and firing chemicals in the formation of grinding wheels, the mixing of a small percentage of wax or finely divided pulverulent materials, as light aluminum powder or heavy iron dust, uniformly through a loading charge, etc., could be cited. One object of our invention comprises the production of a new and improved apparatus for continuously combining dry and liquid ingredients of various types and nature in predetermined proportions into an intimate and uniform mixture and in which the objections and limitations above enumerated and present in methods heretofore employed are eliminated.

Casings of various kinds, including explosive shell and bomb casings, cell casings for dry batteries, molds, etc., are most commonly filled and packed by manual means, including batch mixing of the ingredients and the manual tamping of the product into the casing to produce a dense fill free of voids. This manual process is not only slow and productive of a product varying in density and uniformity of the fill but furthermore requires careful and laborious pre-mixing of the ingredients and the laborious introduction of the resulting mixture into the casings. A further object of our invention resides in the production of a new and improved apparatus for performing such mixing and filling operations automatically and continuously under the action of fluid pressure.

The invention contemplates new and improved apparatus for effecting the continuous fluid pressure conducting of streams of the dry and liquid ingredients in predetermined proportions to a common mixing chamber, the continuous intimate mixing of such ingredients together under the action of the fluid pressure, and the continuous conducting of the mixture to any point for further use or directly into a casing to be filled. Means are provided for handling either one or a plurality of the dry and liquid ingredients and for conducting them to the mixing chamber in the required proportions to form the desired mixture. In the apparatus illustrated, the dry ingredients are brought together and inspirated in a single stream together with atmospheric air to and through the mixing chamber. The liquid ingredients are injected transversely into this stream through a distributing nozzle or a plurality of jets which agitate and commingle all the ingredients into an intimate mixture. The operation is continuous and the mixture is continuously conducted to a point of deposit or into the casing being filled simultaneously with the movement of the dry ingredients through the mixing chamber and the commingling of the liquid ingredients therewith. The production of a new and improved apparatus of this nature and for the purpose described comprises a further object of the invention.

The fill in the final casing product should be uniform, dense and without voids and we have discovered that these requirements are best obtained by conducting the mixture to and laying it directly in the place of its final disposition in the casing. An important feature of the invention therefore contemplates the conducting of the mixture through a conduit to a point approaching but short of the bottom of the casing chamber and the withdrawing of the conduit at a predetermined speed during the filling operation whereby keeping the conduit spaced a uniform distance from the deposited fill. Such spacing of the conduit results in compacting the mixture into a uniformly dense fill without voids as the mixture is forcibly conducted pneumatically into the casing, and the uniform distribution of the mixture is furthermore effected by providing a relative lateral movement between the conduit and casing as by rotating the casing.

An important use of the invention resides in the filling of explosive shell and bomb casings with TNT or other detonating charge and including various desired ingredients and we have herein illustrated and described the invention in connection with such use. Heretofore such casings have been loaded by pouring molten TNT thereinto. Molten TNT has a very high latent heat which must be dissipated before the liquid TNT will solidify and it furthermore solidifies with a considerable shrinkage at the center resulting in the forming of a conical cavity or pipe at the center of the charge. To dissipate this heat, eliminate the pipes and provide dense and solid charges without voids, the casings have been filled by pouring molten TNT thereinto in increments which are manually tamped between pourings, the period for tamping also being quite critical since TNT hardens very quickly when its latent heat has been dissipated. An increment of molten TNT to about a depth of two inches is poured into a casing which is then set aside or placed in a water bath to cool. After about 20 to 30 minutes the liquid TNT has reached a plastic state and has also formed whatever pipes or cavities result from the cooling. At this point an operator takes a small wooden tamping stick and breaks down the surface of the TNT, levelling it off and filling up the pipes and cavities while the TNT is fairly plastic. Other increments are poured and treated in like manner until the casing is filled, the entire operation taking from one and one-half to three hours for a 3″ shell and from five to six hours for a 5″ shell. When the casing has been fully poured and the charge solidified, a hole is drilled in the open end of the charge for receiving a detonator.

Another method employs an adaptor on and extending upwardly beyond the open end of the shell, and the shell and adaptor are filled at a single pouring. This method requires the pouring of 75% more TNT than is necessary to fill the shell, a considerable cooling period, and removal of the additional charge when drilling the detonator hole. A very important feature of our invention resides in a new and improved apparatus or machine for continuously combining dry and molten TNT in proportions and at temperatures producing a molten mixture only slightly above the solidifying temperature and immediately conducting the same into a casing to be filled whereby producing a filled casing that is ready for drilling by the time it is transported to the drilling room.

TNT is normally a yellowish powder which changes very suddenly to the consistency of very light molasses upon being heated to its melting point. In accordance with our invention the filling charge is made up of both dry and molten TNT together with such other ingredients as are required. The dry ingredient is inspirated in and through a conduit in a continuous stream toward the casing to be filled and the liquid ingredient is injected under pressure transversely thereinto in a mixing chamber in the conduit. This action of the liquid ingredient on the dry ingredient continuously forms the two into a uniform mixture of the desired consistency and this mixture is forcibly carried along and packed continuously into the casing as it is formed in the mixing chamber. The dry and molten ingredients are in approximately equal proportions and the temperatures are such that the high latent heat of the molten TNT that is given up to the dry TNT causes the whole mixture to take on a temperature just slightly above the actual crystalline forming temperature, whereby producing a solid fill with slight latent heat. The invention therefore results in a uniform mixture, a filling without voids, of high and uniform density throughout and containing little latent heat, and a continuous process that substantially eliminates manual operations and delays and produces a superior product in less time and at less expense.

The handling of explosive materials together with the loading of shells is a hazardous operation and is subject to large and very damaging explosions during and following the mixing of the ingredients into the explosive batch. A further important feature of our invention resides in the fact that only relatively small quantities of the ingredients are ever brought together and these are continuously combined into an explosive mixture which is continuously deposited into a shell, thus eliminating the formation of large batches of the explosive and limiting any possible explosion to a relatively minor nature. Furthermore, the apparatus comprising our invention for the handling of explosives employs no electricity or any other dangerous features or elements which might well cause explosions. In the preferred form of apparatus, all moving parts are operated by compressed air and such heating as is required is effected by the use of steam and hot water. The production of such an improved method of and apparatus for mixing and loading explosives comprises a further object of the invention.

These and other features of the invention will be best understood and appreciated from the following description of a preferred embodiment thereof selected for purposes of illustration and shown in the accompanying drawings in which, Figs. 1 and 2 are a schematic illustration of one embodiment of our improved apparatus, Fig. 2 being a bottom extension of Fig. 1, Fig. 3 is a vertical sectional view through a building housing the apparatus, Fig. 4 is a plan section taken on line 4—4 of Fig. 3, Fig. 5 is a plan section taken on line 5—5 of Fig. 3, Fig. 6 is a front elevation of the apparatus, Fig. 7 is a side elevation thereof, Fig. 8 is an enlarged vertical sectional view taken on line 8—8 of Fig. 6, Fig. 9 is a bottom plan view of the filling nozzle taken on line 9—9 of Fig. 8, Fig. 10 is an enlarged fragmentary sectional view through a portion of a liquid ingredient tank shown in Fig. 1, Fig. 11 is an enlarged fragmentary view, partly in section, illustrating the clutch control for the dry ingredient feed, Fig. 12 is a side elevation, partly in section, of an automatically operated air control valve, Fig. 13 is a vertical sectional view through a hand operated air control valve, Fig. 14 is a longitudinal sectional view through another automatically operated air control valve, Fig. 15 is a plan view of the body portion of the valve shown in Figs. 16–19, Fig. 16 is a sectional view taken on line 16—16 of Fig. 15 and showing the valve operating mechanism in one position, Fig. 17 is a sectional view taken on line 17—17 of Fig. 15 and showing the valve operating mechanism in the same position, Fig. 18 is a sectional view taken on line 16—16 of Fig. 15 and showing the valve operating mechanism in another position, Fig. 19 is a sectional view taken on line 17—17 of Fig. 15 and showing the valve operating mechanism in the last position, Fig. 20 is a vertical sectional view through the pallet supporting and driving mechanism, Fig. 21 is a view like Fig. 8 but showing a modified construction, Fig. 22 is a fragmentary side elevation thereof, Fig. 23 is a bottom plan view of Figs. 21 and 22, Fig. 24 is a fragmentary view in longitudinal section of a like but further modified construction, Fig. 25 is a bottom plan view of Fig. 24.

We have herein illustrated our invention in the form of apparatus for filling explosive shells with TNT or other explosive materials. TNT is normally a yellowish, granular and free-flowing powder which melts to the consistency of very light molasses upon being heated and, while in the manual filling method heretofore employed and above described the TNT is heated to a very fluid condition, poured, cooled and then tamped into the shells, we propose continuously to combine dry and liquid TNT into an intimate mixture and continuously pack the mixture into the shells simultaneously with the combining of the ingredients. The apparatus embodies means for supplying and feeding both dry and liquid ingredients, means employing compressed air for mixing the ingredients and conducting the resulting mixture into the shells, steam and hot water conductors for maintaining certain ingredients in liquid form and the equipment at proper temperatures, compressed air motors for driving the equipment, and controlling mechanism for performing the several functions substantially automatically under manual supervision. Such mechanism is adapted to handle the ingredients uniformly in a prearranged manner and with a minimum of manual effort and to perform the mixing and loading operations with a minimum possibility of accidental explosions. Furthermore, since the mixing of the ingredients is continuous and only small portions are at any time in the process of being combined, the danger of large explosions is eliminated. A further and very important result is the elimination of the long cooling period and manual tamping operation heretofore required.

The explosive charge comprises a mixture of a dry ingredient and a liquid ingredient or of a plurality of dry and/or liquid ingredients, the machine herein illustrated having capacity to handle two dry and two liquid ingredients. By reference to Fig. 1, it will be noted that one dry feeding apparatus and one liquid feeding apparatus are illustrated at each side of the vertical center line of feed. Both dry feeding means and both liquid feeding means are structurally alike and therefore only one of each is specifically illustrated and described herein. Attention is also called to the fact that the structure shown in Figs. 1 and 2 is of a schematic nature for the purpose of illustrating the general layout of the invention and this structure as thus illustrated is not intended to correspond in every detail to that more specifically illustrated in other views of the drawings.

In Figs. 3, 4 and 5 of the drawings we have illustrated a proposed layout for the arrangement and employment of loading machines embodying our invention. This plan proposes the use of a first floor 10 for the machines and a second floor 12 thereabove for supplying the filling ingredients to the machines. A portion of the first floor is divided into a series of shell filling bays or stockades 14 each adapted to house a shell filling machine 15, and rearwardly of these bays are two conveyors 16 and 17 on which pallets 18 are adapted to bring empty shells to the bays and convey the loaded shells therefrom. Cooperating with the conveyor 16 at each bay is an inclined U-shaped track 19 passing into the bay through an opening 20 in the wall 21 and outwardly thereof through an opening 22. The pallets loaded with empty shells are passed through the opening 20 and after the shells are filled they are trucked outwardly through the opening 22 and along the conveyor 17 in the direction of the arrow.

Dry TNT in free-flowing granular form is supplied to the machines from the upper floor 12 through tubes 23 and liquid TNT is supplied to the machines from a melting tank 24 on the second floor through pipes 25. The TNT is shipped in boxes 26 and is screened at 27 before passing downwardly into the tubes 23 and at 28 before placing it in the melting tank 24.

Each complete loading machine, as illustrated in the drawing, embodies an upper portion (Figs. 1 and 8 and the upper half of Figs. 6 and 7) for feeding and combining the ingredients into the loading mixture and conducting the mixture into a shell, and a lower portion (Fig. 2 and the lower half of Figs. 6 and 7) for carrying and manipulating the shell being loaded. The several operating functions are effected through the use of compressed air, thereby eliminating the dangers incident to the use of electricity and simplifying the apparatus, and steam and hot water are employed for maintaining the equipment and ingredients at predetermined temperatures. The lines conducting the air, steam and water for these functions are for convenience in the drawings respectively indicated by reference letters A, S and W.

The ingredients for the loading mixture are fed into and through a downwardly extending conduit embodying a relatively long and lowermost cylindrical portion 30, a funnel-like top portion 31 and an intermediate mixing chamber portion 32. Disposed above and having exits leading into the top portion 31 are two dry material feeding mechanisms 34 (Fig. 1). Either or both of these mechanisms can be employed. Dry material, as TNT in granular form, is fed to one mechanism 34 from a hopper 36 into which empties one of the supply tubes 23. Uninterrupted flow of material from the hoppers is assured through the employment of an air operated agitator rod 37 in each hopper. Each rod extends into a cylinder 302 and carries a piston therein, a spring 303 normally holding the rod in its retracted position. An air pipe 305 connected to an air supply pipe 84 extends through a valve 307 into each cylinder in such position that air pressure therefrom is adapted to force the pistons and rods forwardly. The valve is rotated from a shaft 51 and its construction is such that this rotation causes pulsating charges of air to enter the cylinders and together with the spring effect rapid reciprocation of the rods.

The feeding mechanism comprises a drum 38 together with a blade 39 which is adjustable toward and from the drum as by screw threaded means 40. The drum is rotated in the direction of the arrow and the amount of material fed by the drum can be varied by this blade adjustment and by changing the speed of drum rotation. The dry ingredient passes downwardly into a restricted portion 41 of the conduit (Fig. 8) with which is associated an air jet 42 for inspirating the ingredient downwardly into the mixing chamber 32. Air is supplied to the jet from a pipe 43 and the air passage through the jet can be kept clear by a clean-out rod 44 cooperating therewith. Also, as illustrated in Fig. 1 and hereinafter described, this air is preheated within a steam jacketed tank 45 just prior to its use at the jet.

It may be desirable at times, for clean-out purposes or otherwise, to blow a charge of air from the jet 42 downwardly through the conduit when the machine is not in operation. We provide a pipe 29 for this emergency which is connected at one end to an air supply pipe 202 and at its other end to the pipe 84 where it enters the tank 45. A normally closed valve 33, like the valve shown in Fig. 14, in the pipe 29 can be operated manually by pushing its exposed valve stem inwardly and, if a continued flow of air is desired, the stem can be held inwardly by a bail 35 pivotally attached to the valve body and adapted to be placed over the depressed end of the stem.

One drum 38 is driven from an air motor 46 and the other drum is driven therefrom through two intermeshing gears 47 of equal size on the drum shafts 51. The motor is geared to a rotor 48 (Fig. 11) and a clutch shaft is driven by the rotor through a square shaft and socket engagement therebetween at 49. The other end portion 50 of the shaft is supported within a sleeve 52 in a bearing 53, the sleeve having slot and pin connection 54 with a pulley 55 also on the shaft 50, a face of the pulley being adapted to cooperate with a clutch disk 56 on the shaft. A spring 58 normally moves the sleeve 52 and pulley 55 away from driving contact with the clutch disk and air pressure from a pipe 60 acting against a piston 62 is adapted to engage the pulley with the clutch disk. Thus the pulley is normally idle and is forced into driving engagement with the clutch disk by air pressure. A round belt 64 connects the pulley to one of the drum shafts 51. It will therefore be apparent that, whereas the air motor may operate continuously, the drums are rotated only when air pressure is exerted against the piston 62. As illustrated in Figs. 1, 6 and 7 the drums 38 are driven from a single motor 46 through reduction gearing at 57.

A supply of the liquid ingredient, as molten TNT from the tank 24 and pipe 25, is contained within a closed tank 66. A pipe 67 extending to the tank is connected to one of the pipes 25 through a valve 68 which is normally closed by means of a spring 70. When the valve closing member is withdrawn against the action of the spring by air pressure from the pipe 71, the diaphragm 72 of the valve moves away from its seat and permits flow of the liquid into the tank 66. This valve is always in closed position during the shell filling operation of the machine. The pipe 67 empties into the center of the tank within a foraminous cylinder 73 which screens the liquid as it passes outwardly into the tank. The liquid is screened a second time as it passes inwardly through a foraminous cylinder 74 and from which it is withdrawn through a pipe 75.

The tank 66 and the molten TNT conveying units are hot water jacketed to maintain the TNT at predetermined temperature and fluidity. Also while we have illustrated the tank 66 as supplied with molten TNT from the melting tank 24, we have so constructed the tank 66 that dry TNT can be placed therein and melted to fluidity by steam heat. In such case the upper screen 73 is removed and the dry TNT is placed directly in the tank through the opening normally closed by the cover 59. This TNT is then melted by turning steam into the jacket surrounding the tank.

During the shell filling operation of the machine, the tank 66 is under predetermined air pressure from a pipe 76 which forces the liquid therefrom through a pipe 75 under pressure. The pipe conduit 75 passes through a controlling valve 77 and from thence to a port 78 in the member 79 containing the mixing chamber 32 (Fig. 8). The port 78 is in communication with an annular port 80 from which extend somewhat downwardly and inwardly into the mixing chamber a plurality of jet-like ports 82. The valve 77 is normally closed by a spring 83 and when it is opened by air pressure from a pipe 84 the liquid is forced under pressure through the ports 82 in a plurality of commingling jets into the mixing chamber. Such action thoroughly mixes the liquid ingredient with the dry ingredient which is simultaneously being injected downwardly through the chamber. The amount of liquid passing through the valve 77 can be regulated by a screw threaded valve needle 86 carrying a pointer 87 movable over an index scale. It is also contemplated to use a flow meter in the line 75 to indicate the rate of TNT flow with great accuracy. The tank 66, valves 68 and 77, member 79 and the pipes carrying the liquid ingredient are hot water jacketed as indicated at W to maintain the liquid at the desired temperature and prevent clogging. The member 79 is also provided with a second port 88 in communication with an annular port 89 from which extends a plurality of jet-like ports 90 for injecting a second liquid ingredient from a tank 66' into the mixing chamber when such ingredient is desired.

The portion 30 of the loading conduit is jacketed at 92 and a double walled hood 94 hung therefrom and open at its bottom end surrounds this portion of the conduit. A double walled exhaust pipe 95 extends outwardly and upwardly from the hood and a flexible exit conduit 96 can be connected to the upper end of this pipe. The function of the hood is to house the shell 98 and prevent the escape of TNT particles and fumes into the room during the filling operation, the opening into the hood being of a size closely receiving the shell as illustrated in Fig. 8. The same jacket chamber surrounds the hood and exhaust pipe 95 and steam is circulated therethrough by means of pipes 97 and 99. The interior wall 101 of the exhaust pipe is formed to Venturi shape and a cooperating air jet 100 serves to exhaust the hood and any loose contents that may be present during the filling operation. Heating of the walls of the hood by the steam jacket also causes any adhering particles to melt and run down the walls into a channel 102 which drains through a pipe 103 to a cup 105. Hot water is circulated through the conduit jacket and around the member 79 by means of pipes at 107. The lower end of the conduit 30 is provided with a nozzle 104 shaped as shown in Fig. 9 to aid in proper distribution of the loading mixture.

In Fig. 10 we have illustrated means cooperating with the liquid ingredient tank 66 for indicating by a suitable signal when the liquid reaches a predetermined level and the tank needs refilling. This means comprises a cylindrical float 106 carried on the bottom end of a rod 108 within the tank. The rod passes upwardly through the top wall of the tank and carries a valve piston 109 closely fitting the chamber 110 of a housing 112. A guide 113 is provided for the rod at the bottom of the tank. The housing 112 is sealed to the tank as by welding at 114 and by the employment of a sealing gasket 115. The rod is permitted vertical movement limited upwardly by a stop 116 on the top of the piston and downwardly by a cross pin 118 carried by the rod.

Compressed air is admitted to the housing 112 through a pipe 120, this air being at a pressure common with that of the pipe 76 which provides compressed air to the tank. The air from the pipe 120 is ported to the top of the cylinder 110, to the chamber beneath the piston and to an annular recess 122 in the piston through connecting ports at 124. A port 126 from the cylinder is in communication with a pipe 128 leading to a whistle or other signal or indicator 129. A vent 130 is provided from the cylinder chamber to the atmosphere.

Passage of the tank liquid up the rod 108 to the cylinder 110 is prevented by a frictionless seal in the form of a flexible bellows 132 of neoprene or other suitable material. The lower portion of the bellows is sealed tightly to the rod at 133 and the upper portion is sealed tightly at 134 to the bottom end of a tube 135 depending from the top wall of the tank. The rod extends loosely through the tube whereby permitting air to pass downwardly from the cylinder 110 to the interior of the bellows. Air pressure common with that within the tank is therefore maintained at both ends of the piston and inside the bellows whereby providing an assembly fully balanced and therefore affected only by gravity and the buoyant effect of the liquid on the float.

When the tank is full of liquid the float raises the piston 109 to its uppermost position in which air pressure communication to the port 126 and whistle 129 from the port 124 is cut off and the port 126 is in communication with the atmosphere through the recess 122 and vent 130. When the liquid reaches a predetermined refilling level permitting downward movement of the float and piston by gravity to the position indicated in Fig. 10, communication of the whistle port with the atmosphere is cut off and communication of such port with the port 124 is established through the piston recess 122. The compressed air thereupon passing through the whistle port sounds the signal indicating that the tank should be refilled. The operation of refilling the tank is hereinafter described.

In Fig. 6 we have illustrated a preferred visual signal arranged on the machine directly in front of the operator and adapted to cooperate with the pipe 128 in lieu of the whistle 129. This signal comprises a cylinder 121 mounted on a side wall of the machine, as illustrated in Fig. 6, and carrying a rod 123 extending downwardly therefrom. The rod carries a piston at its top end within the cylinder and a red ball 125 on its bottom end. The pipe 128 extends into the top end of the cylinder and a spring 127 normally holds the rod and ball upwardly to the position illustrated in full lines in Fig. 6 in which position the ball is out of sight of the operator. When the float 106 drops to the position of Fig. 10, compressed air conducted into the pipe 128 and to the cylinder 121 forces the rod and ball downwardly to the position indicated in broken lines and in which position the ball is in full view of the operator. The operator cannot fail to see this signal and know that the tank needs refilling. A hole 131 is provided through the housing wall to permit downward passage of the ball.

The water lines W together with the communicating compartments are kept filled with water from a tank 136 at the proper elevation and having an overflow port 137. The water is circulated by means of an air motor 138 exhausting through a muffler 139 and operatively connected to and driving a water pump 140. The water circulating system includes a chamber 141 incorporating a steam heating unit 142 therein and the temperature of the water is automatically regulated by controlling the flow of steam to this unit. The controlling means embodies a mercury or other temperature sensitive medium bulb 143 in the water system connected by a tube 144 to and operating a steam controlling valve 146 in the steam pipe to the heating unit. A second and normally closed valve 148 in the steam line to the heating unit normally cuts off the flow of steam thereto and permits such flow only when the machine is in operation. This valve has an air line communication 150 thereto from the valve 189 which is adapted to open the valve 148 when the air is turned on for operating the machine. The circulation of the water through the heater 141 and from thence through the several parts to be heated is indicated by arrows in Fig. 1.

As illustrated in Fig. 2 the shell 98 to be filled is supported on a pallet 154 seated on the top end of a stem or shaft 156 rotatably supported on a member 157. The member 157 is in turn seated on the top end of a hydraulically operated ram 158 extending downwardly into a cylinder 160 and carrying a piston 161 fitting the cylinder walls. Means, including an air motor 162 provided with a worm in driving engagement with a worm wheel 164 nonrotatably connected to the shaft 156, is provided for rotating the pallet. A conical double-walled apron 165 is supported on a member 166 beneath the pallet and a steam connection S to the apron provides steam for keeping the apron heated. The peripheral edge of the apron is turned upwardly to form an annular trough 167. Any particles of TNT falling onto the apron during the shell filling operation become melted and flow downwardly into the trough from which they are drained through a pipe 168. Water of condensation is drained from the apron through a pipe 169 to a steam trap 170. Depending from the margin of the apron 165 (Figs. 6 and 7) is a cylindrical shield 171 including a door 172 having a bracket 173 at its inner face for supporting a cup 174 beneath the drain pipe 168. The door can be opened and the cup emptied whenever occasion requires.

It is desirable that the shell receiving pallet 154 shall be resiliently supported and with ample strength to carry the weight of a shell being filled and take such jolts and downward thrusts as may result from placing the shells on the pallet and, furthermore, that such weight and thrusts shall not be conducted to or affect the pallet driving mechanism including the air motor 162. In Fig. 20 we have specifically illustrated a preferred pallet supporting mechanism for performing these functions.

The member 157' is a yoke having a stud 320 at its bottom end screw threaded into the top end of the ram 158. Supported rigidly in the top end of the yoke is a casting 322 secured by set screws 323. The bottom end of the casting is in the form of a collar 325 extending about and supporting the top end of the worm wheel housing 324 against lateral movement, these parts being secured together by set screws 326. The housing is supported on a stud 328 threaded into the base of the yoke and provided with flats 329 for receiving a wrench and also with a lock nut 330 for holding the stud securely in position when it is properly adjusted into supporting contact with the housing. The worm wheel 164 rests on a ball 332 for free rotation in the housing. The pallet shaft 156' extends downwardly through the casting 322 and its extreme bottom end is squared to fit a squared socket 334 in the top end of the worm wheel shaft.

A collar 335 on the pallet shaft rests on the rotary top element 336 of a ball bearing unit, the bottom and nonrotating element of which is seated in a block 338 housed in the top end of the casting. A spline key at 340 prevents rotation of the block in the casting but permits free relative movement longitudinally. The block 338 is supported on a compression spring 341 surrounding the shaft and resting on the casting and a cover member 342 secured to the top of the casting limits upward movement of the pallet shaft. Rotary movement of the yoke is prevented by an arm 344 extending laterally therefrom and slidably engaging a fixed vertical post 345. The apron 165 is secured to and supported on the casting 322 by brackets 343.

It will be apparent that the yoke 157' supports the entire weight of the pallet 154 and its load and furthermore permits a substantial yielding of the pallet downwardly to absorb severe thrusts when loading the pallet. It will also be apparent that the ball bearing unit at 336 serves as a thrust and radial bearing sustaining the pallet shaft both downwardly and laterally. A washer 346 of leather or like material is preferably seated on the casting beneath the block 338 for cushioning any contact of these parts. The pallet and its shaft are normally driven at about 100 to 150 R. P. M. from the motor 162 without placing any longitudinal load on the worm 164 or its housing 324, the latter being firmly supported by the stud 328 while the worm has free rotation in the housing on the ball bearing 332.

The ram 158 together with the parts supported thereon are adapted to be elevated by the passage of oil 175 under pressure from a tank 176 through a pipe 177 to the cylinder below the piston 161, and they are adapted to be forced downwardly by the passage of oil under pressure from a tank 178 through a pipe 179 to the cylinder above the piston. The rate of such movement is controlled to predetermined speeds by the employment of free-flow throttling valves 180 in the pipes. The oil in the tanks is placed under pressure through the employment of compressed air conducted thereto through pipes 181 and 182. The range of upward movement of the ram is such as to bring the shell to be filled to the position within the hood 94 indicated in Fig. 8. The operation of the machine, including the movement and filling of the shell, is controlled both manually and automatically through a system of air valves hereinafter more specifically described.

Reference characters 184, 185, 186, 187, 188 and 189 (Figs. 2 and 5) indicate a bank of manually operated air valves adapted to control various parts of the machine as hereinafter described. Reference characters 192 and 194 indicate two automatically operated master air valves. Reference characters 196, 197 and 198 indicate three air valves cooperating with the master valves 192 and 194 and adapted to be automatically operated as and for the purpose hereinafter described by an arm 200 carried by the hydraulically operated ram 158.

The source of compressed air supply comprises a pipe 202 from which the air passes through a filter 204. The pipe 202 extends through a pressure regulator R to the bank of manually operated valves 184-189 and to the valve 196. A pipe 205 branching from the pipe 202 again branches into two pipes 206 and 207. The pipe 206 extends through a pressure regulator R to the master valve 192. The branch pipe 207 extends through a pressure regulator R to the master valve 194. The air line connections from the valves 197 and 198 are hereinafter described. Pressure gauges G and regulators R are provided at several required places in the air lines.

The construction of the manually operated valve 184 is shown in Fig. 13. This valve has a chamber 212 in communication with the air supply pipe 202, a chamber 213 in communication with a pipe 214, and an exhaust chamber and pipe 215 open to the atmosphere. Two normally closed spring pressed valve elements 216 and 218 are located respectively between the chambers 212 and 213 and chambers 213 and 215. A manually operated lever 220 pivoted at 221 and having rollers operative on a rocker 222 pivoted at 223 is adapted to depress and open either one or the other of these spring seated valve elements. When the valve 216 is opened, air pressure from the pipe 202 passes from the chamber 212 to the chamber 213 and from thence to the pipe 214. When the valve 218 is opened, air is exhausted from the chamber 213 through the chamber 215. The construction of valves 185, 188 and 189 is the same except that in valves 188 and 189 the rocker 222 is of the locking type which remains in one extreme position or the other whereas in valves 184 and 185 the rocker normally remains in a neutral position leaving both spring operated valve elements closed.

The construction of the manually operated valve 186 is shown in Figs. 15-19 and the construction of valve 187 is the same. This valve 186 has four chambers 226, 227, 228 and 229 and four normally closed spring pressed valve elements 230, 231, 232, 233 control the air flow to and from these chambers. A manually operated lever 236 pivoted on brackets 235 at 237 and operating on a rocker 238 pivoted at 239 is adapted to open the valves 230 and 231 when the lever is pivoted in one direction (Figs. 16 and 17) and to open the valves 232 and 233 when the lever is pivoted in the other direction (Figs. 18 and 19). The chamber 226 is in communication with the air supply pipe 202. When the lever is in the position of Figs. 16 and 17, air pressure communication is established from the pipe 202 and chamber 226 to the chamber 228 and pipe 76, and the pipe 71 is exhausted through the chamber 227, exhaust port 242 and exhaust pipe 244 to the atmosphere. When the lever is in the position of Figs. 18 and 19, the pipe 76 and chamber 228 are exhausted through the open valve at 232 and air pressure is established to the chamber 227 and pipe 71 from the chamber 226 through a passage 246, chamber 229, and passage 248. The lever and rocker are of the locking type which remain in one or the other of the valve opening positions. The valve 186 is adapted to control the refilling of the tank 66 at the right hand side of the machine (Fig. 1) and the valve 187 is adapted in like manner to control the refilling of the tank 66' at the left hand side of the machine. Pipes 71' and 76' from valve 187 correspond to pipes 71 and 76 from valve 186.

The construction of the master valves 192 and 194, illustrated in Fig. 12, is the same as the valve 186 above described, except that these master valves are operated by air pressure instead of manually. A rocker 250 pivoted at 252 is adapted to open the spring closed valve elements in the manner above described in connection with the manually operated lever 236, the rocker being in the neutral position when no air pressure is present. A member 253 slidably mounted in the valve body 254 has a ball and socket connection 255 to one end of the rocker. The member has a piston 256 at its bottom end operating within a cylinder 258. An air pipe 260 to the valve 192 is in communication with the bottom of the cylinder beneath the piston. A port 264 extends from the cylinder above the piston to the valve chamber 266 which is in communication with the main air supply pipe 206. When the air pressure is released from the pipe 260 the air pressure in the cylinder above the piston will move the piston downwardly and pivot the rocker to the left. When the air pressure is open to the pipe 260 its greater area of operation on the bottom of the piston will overcome the smaller pressure on the top of the piston and cause upward movement of the piston and pivotal movement of the rocker to the right. A pipe 268 extending from the valve 194 corresponds to the pipe 260 of the valve 192 (Fig. 2).

The construction of the valve 196 is shown in Fig. 14. This valve comprises a cylindrical body 270, having two chambers 274 and 275 therein with a communicating port 276 therebetween. The air supply pipe 202 is in communication with the chamber 274 and a valve element 278 normally held seated by a spring 279 prevents passage of the air through the port 276 into the chamber 275. A plunger 280 extending through the chamber 275 and port 276 has its inner end in contact with the valve element 278. A block 281 pinned to the outer end of the plunger is housed within a bushing 282 screw threaded into the body 270. The free outer end 284 of the plunger extends outwardly through the bushing and a compression spring 285 within the bushing normally keeps the plunger in the outermost position illustrated in Fig. 14. A compression spring 286 serves to maintain a packing 288 in place about the plunger within the chamber 275 and a rocker 289 pivoted to the bushing at 290 and carrying a roller 292 is in contact with the end 284 of the plunger. Inward pivotal movement of the rocker when engaged by the arm 200 is adapted to force the plunger inwardly, unseat the valve element 278 and permit air under pressure to pass into the chamber 275 and outwardly to the pipe 268. Valves 197 and 198 are of the same construction and are arranged respectively to exhaust the pipes 260 and 268 when engaged by the arm 200.

Attention is called to the fact that no electricity is employed and that all moving parts are operated either manually or by compressed air. Furthermore while the machine is arranged for semi-automatic operation, it is also so constructed that each operating unit is at all times under manual control at the will of the operator. This manual control is maintained through the bank of manually operated air valves 184—189 shown in Figs. 2 and 5. Also, while as illustrated in Fig. 5 each set of these valves is located adjacent to its loading machine within a filling bay or stockade 14, it should be understood that the control can be located at a remote point if desired.

The operation of the machine is substantially as follows.

The steam supply for heating the water at 142, the air heating tank at 45, the hood at 94 and the apron at 165 is turned on by hand valve (not shown). Raising of the hand lever 220 (Fig. 13) of the valve 189 directs compressed air to the water circulating pump air motor 138 and opens the steam valve 148. This valve 189 is of the locking type and is left in this position during the shell filling operation.

Dry TNT in granular form is supplied to the tubes 23 from the upper floor 12 as is also melted TNT in liquid form to the pipes 25. The tank 66 is filled from its pipe 25 as follows. The valve 186 is moved to the position illustrated in Figs. 18 and 19 in which position the pipe 76 and the tank 66 are exhausted through the open valve port illustrated in Fig. 18 and compressed air is directed into the pipe 71 through the open valve port illustrated in Fig. 19 whereby opening the valve 68. The valve 186, which is of the locking type, is left in this position until the tank fills with liquid TNT from the pipes 25 and 67. The valve 186 is then moved to the position of Figs. 16 and 17 in which the air pressure in the valve 68 and pipe 71 is exhausted (Fig. 17) and compressed air is directed into the pipe 76 to the tank 66. The valve 68 is thereupon closed by its spring 70 and the tank is held under pressure from the air line. The valve 186 is kept in this position during the loading operation of the machine. The valve 187 is adapted to control in like manner the operation of another liquid ingredient supplying unit having a like tank 66' and like mechanism cooperating therewith.

The ram 158 together with the shell supporting pallet 154 are normally in the down position illustrated in Figs. 2, 6 and 7 and the master valve 192 is in the position of Fig. 12 wherein the air line 181 is exhausted and air pressure is open to the line 182 and tank 178 from the supply line 206. Also, the exhaust valve 198 having been opened by the arm 200 at its last downward movement, the master valve 194 is in the position indicated in Fig. 12 wherein the line 84 is exhausted and the liquid controlling valve 77 is held closed and the powder feed controlling clutch shown in Fig. 11 is held open.

After placing a shell 98 on the pallet 154, the operator pivots the lever 220 of the valve 188 to the left (Fig. 13) to conduct air under pressure from the supply pipe 202 to the line 300 leading to the powder feeding motor 46 and pallet rotating motor 162. The pallet 154 is thereupon rotated but the powder feeding mechanism does not operate until the clutch 55—56 is closed. The valve 185 to the air line 268 is normally in closed position and is operated only in emergency when it is desired to control the feed manually, this operation normally being controlled automatically through the valves 196 and 198 together with the master valve 194.

The operator next pivots the lever 220 of valve 184 to the left (Fig. 13) to conduct air under pressure from the supply pipe 202 to the pipe 214 and line 260 whereby pivoting the rocker 250 of the master valve 192 to the right (Fig. 12), thereby exhausting the line 182 and admitting air under pressure to the line 181 and tank 176. The ram 158 thereupon moves upwardly to project the conduit 30 into the shell (Fig. 8), and this movement continues until the arm 200 opens the valves 196 and 197 by engaging their rollers 292. Air pressure is thereupon admitted to the line 268 from the line 202 through the valve 196 whereby moving the master valve 194 to a position admitting air under pressure to the line 84 which thereupon (1) opens the liquid feeding valve 77, (2) closes the powder feeding clutch 55—56, (3) starts the air injection at 42 and exhaust at 100, and (4) starts the operation of the agitators 37 in the powder magazines 36 by conducting pulsating air to their operating cylinders 302 through rotation of the valve 307. The valve 197 is simultaneously opened whereby exhausting the pipe 260 and permitting the master valve 192 to move to its other position exhausting the line 181 and admitting air under pressure to the line 182. The movement of the ram together with the pallet and shell is thereupon reversed and they move downwardly.

The valve 197 controls the extreme upward movement of the ram and the upward limit is such that the nozzle 104 is spaced approximately two and one-half inches from the bottom of the shell chamber as and for the purpose hereinafter described. Simultaneously with the reversing of the ram and the starting of its downward movement, the dry TNT is fed and is injected downwardly into the mixing chamber 32 and the liquid TNT is injected transversely thereinto under pressure through the jet ports 82. It will be understood that other dry ingredients can be added from the hopper 36' and other liquid ingredients can be injected through the ports 90 from the tank 66' when desired. The jets of liquid agitate and commingle all the ingredients continuously into an intimate mixture as they pass through the mixing chamber and the mixture is continuously passed downwardly with the air stream to and through the nozzle 104.

It will be apparent that the compressed air from the nozzle 42 along with the surrounding inspirated air carries the dry ingredient into the mixing chamber and the explosive mixture into the shell. This air should be at normal room temperature of approximately 70° F. or above, up to approximately 140° F., and the compressed air is passed through the chamber 45, which can be heated by steam or hot water, for the purpose of assuring this temperature. While the heated chamber 45 brings the nozzle compressed air to a temperature approximating 185° F., the mixing of this air with the surrounding inspirated air at normal room temperature results in a conducting air mixture having a temperature approximating 130° F. to 140° F. Thus, while the specific temperature of this air is not critical it has been found that best results are produced within the limits herein stated and that a temperature below 70° F. has a deleterious effect on the explosive mixture.

It is highly desirable that the fill in the shell shall be uniformly distributed, dense and free of voids and we have discovered that these objectives are obtained in high degree by distributing and packing the material from a uniformly spaced distance from the nozzle 104 during the entire filling operation, as illustrated in Fig. 8. We have found that in the filling of a Navy 3" A. A. shell a spacing distance of about 2½" gives very satisfactory results, though the spacing is different for each type or size of shell, and the machine is therefore preferably so operated as to maintain this proper spacing during the filling operation. The valves 196 and 197 are so located that the nozzle 104 is initially thus spaced from the bottom of the shell and this continuous spacing of the nozzle from the top of the fill during the entire loading operation as the shell moves downwardly is maintained by thus moving the shell at a speed commensurate with the loading of the material into the shell. The speed of movement of the ram in both directions is controlled by adjusting the throttling valves 180.

The distribution of the material in the shell is aided by the peculiar shape of the nozzle exit as illustrated in Figs. 8 and 9 and by rotating the shell or otherwise providing a relative lateral movement between the nozzle and shell. The constricted intermediate portion of the nozzle end (Fig. 9) serves to provide a uniform spray pattern adapted in association with the rotating shell to distribute the mixture uniformly over the area being filled. This uniform spray together with the rotation of the shell, the maintenance of a uniform spacing of the nozzle from the fill and the uniform pressure at which the mixture is projected into the shell provides a fill of uniform density both transversely and longitudinally of the shell and also provides a smooth and flat top surface on the charge which substantially minimizes the subsequent drilling operation necessary for placing a detonator within the charge.

When the arm 200 reaches and opens the valve 198 the filling of the shell has been completed. Opening of this valve exhausts the line 268 to the master valve 194 whereupon the latter moves to a position exhausting the line 84 which automatically stops the feeding of the dry and liquid ingredients and shuts off the air to the injection and exhausts at 42 and 100 and to the agitators at 302. As illustrated in Fig. 2, the ram continues to move downwardly until the piston 161 hits the bottom of the cylinder and in such position the shell is clear of the hood 94 and can be removed from the pallet. The loading cycle is now completed and the machine is ready for the next shell.

While the rotation of the pallet 154 can be stopped at the end of each cycle by manipulating the hand valve 188, preparatory to removing the filled shell and replacing it with an empty shell, such operation is not wholly essential since the air motor 182 can be easily stalled by grasping the shell, or the shells can be removed and replaced without stalling the motor since the pallet does not rotate at a high speed. Furthermore, the rotation of the pallet can be controlled automatically as by a clutch of the nature shown in Fig. 11 or by an automatically operated valve, all as will be quite apparent.

The filling operation for each shell as above described is normally entirely automatic after the operator opens the valve 184 and starts the shell on its upward movement, but it will be apparent that all operations are at all times under the control of the operator through the bank of manually operated valves 184—189 and he can stop, start and continue the operations at will. The maintaining of proper temperature and pressure within the tank 66 is of substantial importance and these conditions within the tank are always available to the operator through a dial thermometer 304 having a portion extending into the tank and a pressure dial 306 in communication with the tank. A tachometer 308 can be associated with a shaft 51 of the powder feeding units to indicate the feeding speed of the drums 38.

The machine is preferably enclosed within a cover 310 including a horizontal portion 312 having an opening therethrough of just sufficient size to receive and permit passage of the cylindrical shield 171 depending from the conical apron 165, and the shield is of such length that it never passes beyond this opening. It will also be understood that suitable flexible hose connections are provided for conducting air and steam to the movable parts carried on the ram 158.

In Figs. 21—25 we have illustrated two modified forms of conducting and mixing conduit member for the dry and liquid ingredients. The top portion of these modified constructions is the same as illustrated in Fig. 8 and is indicated by like reference characters. These elements include the dry material receiving funnel-like passage 31 leading into the inspirating chamber 41 and from which compressed air from a jet 42 inspirates atmospheric air and dry material downwardly through an orifice 360.

In Figs. 21—23 the conduit member comprises a conduit 362 having a pipe 366 cooperating therewith. The conduit 362 for conducting the dry material downwardly from the orifice 360 is carried by the body 364 in alignment with the orifice. A nozzle 104 like that shown in Fig. 8 is carried on the bottom end of the conduit. The liquid ingredient pipe 366 extends downwardly along and closely adjacent to the conduit and its bottom end is provided with a liquid spraying nozzle 368 coextensive with the longer diameter of the nozzle 104. The nozzle 368 is so arranged adjacent to and below the nozzle 104 that liquid injected from the nozzle 368 commingles with the dry ingredients projected from the nozzle 104 and forms an intimate mixture 370 therewith. The pipe 366 and its contents are kept heated by a steam or hot water pipe 372 extending along and closely adjacent to opposite sides thereof. The pipes 366 and 372 are directly adjacent to and attached to the conduit as at 374.

In Figs. 24 and 25 the conduit member comprises a centrally disposed conduit 380 and an outer pipe 382 cooperating therewith. The centrally disposed conduit 380 is carried by the member 364 in the same position as the conduit 362 illustrated in Fig. 21. Surrounding the conduit 380 is the pipe 382 which latter is jacketed at 384. The central passage within the conduit is adapted to conduct dry material downwardly and the passage between the conduit and the pipe 382 is adapted to conduct the liquid ingredient downwardly. The bottom ends of the conduit and pipe are formed to the nozzle shape illustrated in Figs. 24 and 25 and include an 8-shaped oblong exit 386 for the liquid. This exit is constructed to direct the liquid inwardly in opposing directions about and into intimate contact with the dry material projected from the mouth of the conduit, whereby forming the ingredients into an intimate mixture 388. Steam or hot water is conducted into the jacket chamber at its top end and circulation is maintained through a return pipe 390.

In the loading of experimental split shells which can be dismantled and the charge removed and studied it is desirable to coat the inside of the shell with wax before filling in the charge, the wax coating thereafter permitting easy removal of the charge. We conveniently perform this operation in our machine by providing the tank 66' with a supply of wax in melted form. The empty shell placed on the pallet is first coated with the wax from the tank 66' by spraying the wax thereinto and therealong, and the shell is then loaded with the dry and liquid ingredients mixture in the manner above described. It is quite possible that it may be desirable likewise to coat the inside of shells with various materials for various purposes before loading and we desire it to be understood that our invention is well adapted to carry out such operation conveniently and efficiently. It is pointed out that the conduit members illustrated in Figs. 21—25 are particularly adapted to serve this function since the liquid ingredients can be projected directly against and along the shell wall from the bottom of the member as the member is moved through the shell.

It will now be apparent that our invention enables the loading of shells or the like by continuously passing the ingredients for explosives or other mixtures to a mixing chamber, intimately mixing the ingredients together in the chamber and conducting the resulting mixture directly to the shell being loaded, all simultaneously and in a single and continuous operation under the action of compressed air. The invention not only reduces the handling of the materials and the time and manual labor required to a minimum but when handling explosives it also reduces the explosion hazards to a minimum. Furthermore, the loading charge produced is substantially superior in being of uniform character throughout the charge and in different shells, and in being of maximum density and free from voids. The materials are also handled in a clean and orderly manner, the shell 98 being enclosed within the hood 94 during the loading operation and all explosive particles and overflow outside the shell being carried away through the exhaust channel 95—96 and the hood and apron drains 103 and 168, whereby eliminating the escape of surplus materials and noxious fumes to the loading room atmosphere.

Another very important and valuable feature of wide scope resulting from our invention comprises the quick and easy production of uniform mixtures from a plurality of ingredients which may vary very substantially in composition and character. In accordance with the invention, various dry materials of different mesh and specific gravities can be quickly, continuously and uniformly mixed with liquids of different specific gravities and viscosities, all in predetermined proportions, to produce numerous products of precise composition in small or large quantities and at minimum cost in both time and expense. Such uniform mixtures and the rapid and easy production thereof possible with our invention have heretofore been wholly impossible. A further and very important feature of the invention, as heretofore described, relates particularly to the mixing of dry and molten explosive ingredients in such proportions and temperatures as to produce loaded shells having little latent heat, whereby reducing the cooling time thereof to a minimum and permitting the continuous loading and completing of shells for immediate use without the cooling delay lag heretofore required.

While we have herein illustrated our invention in connection with the loading of explosive shells and have particularly illustrated a machine having a fixed explosive conducting conduit and nozzle in association with a movable shell supporting pallet, we desire it to be understood that the invention is not to be considered as limited to such relative movement or to details of construction and operation herein described or to the particular filling material handled. It is contemplated that the machine is applicable to the continuous mixing of various ingredients and the depositing of the mixture in any manner desired or into a mass from which the mixture can be filled manually into containers, or otherwise employed. The machine contemplates a complete dry material feeding apparatus, including hopper and metering means, for each ingredient, whereby providing for definite and wide variation in percentages of mixture and an accurate control of these percentages not otherwise possible, it being understood that different ingredients have different characteristics requiring different handling and control.

Having disclosed our invention, what we claim as new and desire to secure by Letters Patent of the United States is:

1. Apparatus for delivering material into and packing it in an open-mouthed receptacle moving axially while being filled with said material, said apparatus comprising a mixing head disposed outside the mouth of said receptacle, an elongated filling tube extending from said head into said receptacle through the open mouth thereof with a remote external open end of said tube initially disposed adjacent but spaced from the bottom of the receptacle, a jet for gaseous pressurized fluid axially aligned with and spaced axially from the opposite internal open end of said tube located within said head for driving material through and out of said remote open end of said tube, means for feeding a loose dry ingredient of said material into said head circumferentially of said jet to bring said dry ingredient under the driving influence of said pressurized fluid, and means within said head for injecting a plurality of streams of a wet ingredient radially into said dry ingredient prior to the entrance thereof into the internal open end of said tube under the driving influence of said pressurized fluid.

2. Apparatus for delivering material into and packing it in an open-mouthed receptacle moving axially while being filled with said material, said apparatus comprising a mixing head disposed outside the mouth of said receptacle, an elongated filling tube extending from said head into said receptacle through the open mouth thereof with a remote external open end of said tube initially disposed adjacent but spaced from the bottom of the receptacle, a funnel-shaped mouth formed in said head at the internal open end of said tube, a jet for gaseous pressurized fluid axially aligned with and spaced axially from said funnel-shaped mouth of the internal open end of said tube for driving material through and out of said remote open end of said tube, means for feeding a loose dry ingredient of said material into said head circumferentially of said jet to bring said dry ingredient under the driving influence of said pressurized fluid, annular passages formed within said head around said funnel-shaped mouth and connected to said mouth by radially extending passages spaced around said mouth for injecting a plurality of streams of a wet ingredient radially into said dry ingredient prior to the entrance thereof into said mouth at the internal open end of said tube under the driving influence of said pressurized fluid.

3. Apparatus for delivering material into and packing it in an open-mouthed receptacle moving axially while being filled with said material, said apparatus comprising a mixing head disposed outside the mouth of said receptacle, an elongated filling tube extending from said head into said receptacle through the open mouth thereof with a remote external open end of said tube initially disposed adjacent but spaced from the bottom of the receptacle, a cylindrical chamber having a funnel-shaped discharge end formed in said head, a jet for gaseous pressurized fluid extending axially of and through said chamber into said funnel-shaped end thereof for driving material into and through said tube and out of said remote open end thereof, means for feeding a loose dry ingredient of said material into said chamber and the funnel-shaped end thereof circumferentially of said jet to bring said dry ingredient under the driving influence of said pressurized fluid, and means within said head between the internal open end of said tube and the funnel-shaped discharge end of said chamber for injecting a plurality of streams of a wet ingredient radially into said dry ingredient prior to the entrance thereof into the internal open end of said tube under the driving influence of said pressurized fluid.

4. Apparatus for delivering material into and packing it in an open-mouthed receptacle moving axially while being filled with said material, said apparatus comprising a mixing head disposed outside the mouth of said receptacle, an elongated filling tube extending from said head into said receptacle through the open mouth thereof with a remote external open end of said tube initially disposed adjacent but spaced from the bottom of the receptacle, a cylindrical chamber having a funnel-shaped discharge end formed in said head, a jet for gaseous pressurized fluid extending axially of and through said chamber into said funnel-shaped end thereof for driving material into and through said tube and out of said remote open end thereof, means for feeding a loose dry ingredient of said material into said chamber and the funnel-shaped end thereof circumferentially of said jet to bring said dry ingredient under the driving influence of said pressurized fluid, a funnel-shaped mouth formed within said head between the internal open end of said tube and the funnel-shaped discharge end of said chamber, and means within said head between the internal open end of said tube and the funnel-shaped discharge end of said chamber for injecting a plurality of streams of a wet ingredient radially into said dry ingredient within said funnel-shaped mouth prior to the entrance thereof into the internal open end of said tube under the driving influence of said pressurized fluid.

5. Apparatus for delivering material into and packing it in an open-mouthed receptacle moving axially while being filled with said material, said apparatus comprising a mixing head disposed outside the mouth of said receptacle, an elongated filling tube of substantially circular cross-section extending from said head into said receptacle through the open mouth thereof with a remote external open discharge end of said tube initially disposed adjacent but spaced from the bottom of the receptacle, a jet for gaseous pressurized fluid axially aligned with and spaced axially from the opposite internal open end of said tube located within said head for driving material through and out of said remote open end of said tube, means for feeding a loose dry ingredient of said material into said head circumferentially of said jet to bring said dry ingredient under the driving influence of said pressurized fluid, means within said head for injecting a plurality of streams of a wet ingredient radially into said dry ingredient prior to the entrance thereof into the internal open end of said tube under the driving influence of said pressurized fluid, said discharge end of said tube being diametrically reduced in one plane coincident with the axis of said tube to deliver said material therefrom in a substantially flat ribbon-like stream.

6. Apparatus for delivering material into and packing it in an open-mouthed receptacle moving axially while being filled with said material, said apparatus comprising a mixing head disposed outside the mouth of said receptacle, an elongated filling tube of substantially circular cross-section extending from said head into said receptacle through the open mouth thereof with a remote external open discharge end of said tube initially disposed adjacent but spaced from the bottom of the receptacle, a jet for gaseous pressurized fluid axially aligned with and spaced axially from the opposite internal open end of said tube located within said head for driving material through and out of said remote open end of said tube, means for feeding a loose dry ingredient of said material into said head circumferentially of said jet to bring said dry ingredient under the driving influence of said pressurized fluid, means within said head for injecting a plurality of streams of a wet ingredient radially into said dry ingredient prior to the entrance thereof into the internal open end of said tube under the driving influence of said pressurized fluid, said discharge end of said tube being diametrically reduced in one plane coincident with the axis of said tube and diametrically enlarged in a plane at right angles to the plane of diametrical reduction to deliver said material therefrom in a substantially flat ribbon-like stream.

7. Apparatus for delivering material into and packing it in an open-mouthed receptacle moving axially while being filled with said material, said apparatus comprising a mixing head disposed outside the mouth of said receptacle, a mixing chamber in said head, an elongated filling tube having an internal open end communicating with said chamber said tube extending from said head into said receptacle through the open mouth thereof with a remote external open discharge end of said tube initially disposed adjacent but spaced from the bottom of the receptacle, a jet for gaseous pressurized fluid axially aligned with and spaced axially from the opposite internal open end of said tube located within said head for driving material through and out of said remote open end of said tube, means for feeding a loose dry ingredient of said material into said head circumferentially of said jet to bring said dry ingredient under the driving influence of said pressurized fluid, a plurality of radial passages formed within said head and discharging into said chamber for injecting a plurality of streams of a pressurized thermo-liquified ingredient into said dry ingredient prior to the entrance thereof into the internal open end of said tube under the driving influence of said pressurized fluid, and a heating jacket formed around said tube from said head to said discharge end of said tube for maintaining said thermo-liquified ingredient in a liquid state until discharged with said dry ingredient from the discharge end of said tube.

8. Apparatus for delivering material into and packing it in an open-mouthed receptacle moving axially while being filled with said material, said apparatus comprising a mixing head disposed outside the mouth of said receptacle, a mixing chamber in said head, an elongated filling tube having an internal open end communicating with said chamber said tube extending from said head into said receptacle through the open mouth thereof with a remote external open discharge end of said tube initially disposed adjacent but spaced from the bottom of the receptacle, a jet for gaseous pressurized fluid axially aligned with and spaced axially from the opposite internal open end of said tube located within said head for driving material through and out of said remote open end of said tube, means for feeding a loose dry ingredient of said material into said head circumferentially of said jet to bring said dry ingredient under the driving influence of said pressurized fluid, a plurality of radial passages formed within said head and discharging into said chamber for injecting a plurality of streams of a pressurized thermo-liquified ingredient into said dry ingredient prior to the entrance thereof into the internal open end of said tube under the driving influence of said pressurized fluid, and a heating jacket formed around said head and around said tube from said head to said discharge end of said tube for maintaining said thermo-liquified ingredient in a liquid state until discharged with said dry ingredient from the discharge end of said tube.

9. Apparatus for moving a receptacle axially while being filled and packed with material, said apparatus comprising a supporting platform for said receptacle, a vertically operable ram supporting said platform, a piston on the lower end of said ram operable in a cylinder closed at its opposite ends respectively, a pair of tanks connected respectively to the upper end of the cylinder above said piston and to the lower end of the cylinder below said piston, aqueous fluid in the lower portion of each tank, pressurized gaseous fluid in the upper portions of each tank, and valve means controlling the flow of said aqueous fluid between said tanks and the opposite ends respectively of said cylinder for raising and lowering said platform.

10. Apparatus for rotating and moving a receptacle axially while being filled and packed with material, said apparatus comprising a supporting platform for said receptacle, a vertically operable ram supporting said platform, a piston on the lower end of said ram operable in a cylinder closed at its opposite ends respectively, a pair of tanks connected respectively to the upper end of the cylinder above said piston and to the lower end of the cylinder below said piston, aqueous fluid in the lower portion of each tank, pressurized gaseous fluid in the upper portions of each tank, and valve means controlling the flow of said aqueous fluid between said tanks and the opposite ends respectively of said cylinder for raising and lowering said platform and a fluid motor carried by said ram for rotating said platform during lowering thereof.

11. Apparatus for axially moving a receptacle being filled and packed with material, comprising a platform for supporting the receptacle, a ram for raising and lowering said platform, a stem depending from said platform, a head on said ram, a bearing for said stem slidably mounted in an axial cavity in said head, a collar on said stem resting on the upper side of said bearing, a spring encircling said stem and exerting an upward force against the under side of said bearing, and a cap on said head engageable by said collar for limiting upward movement of said platform relative to said ram.

12. Apparatus for rotating and axially moving a receptacle being filled and packed with material, comprising a platform for supporting the receptacle, a ram for raising and lowering said platform, a stem depending from said platform, a head on said ram, a bearing for said stem slidably mounted in an axial cavity in said head, a collar on said stem resting on the upper side of said bearing, a spring encircling said stem and exerting an upward force against the under side of said bearing, a cap on said head engageable by said collar for limiting upward movement of said platform relative to said ram, a worm wheel rotatably mounted in said head and having a splined connection with said stem, and a fluid motor carried by said head and operatively connected to said wheel for rotating said platform during raising and lowering thereof by said ram.

13. Apparatus for filling and packing a receptacle with composite material including a normally solid thermo-liquified ingredient, said apparatus comprising a head for mixing the ingredients of said material, a delivery tube extending downwardly from said mixing head to an extent substantially equal to the depth of the receptacle, means for raising the receptacle to an elevation wherein the open upper end of the receptacle lies adjacent the bottom of said mixing head with the delivery tube projecting into said receptacle and the delivery end thereof lying adjacent but spaced from the bottom of the receptacle, means for extruding the mixed ingredients from the delivery end of said tube into the receptacle, means for lowering said receptacle simultaneously with said extrusion, and means surrounding said mixing head said tube and said receptacle in its raised position for maintaining said thermo-liquified ingredient in a flowable state until the mixture is delivered into said receptacle by the delivery end of said tube, said receptacle surrounding means comprising a hood having an open bottom of substantially the same cross-sectional shape and of slightly greater dimension than the receptacle for entrance and exit of the receptacle, and means for exhausting gaseous fluid from the interior of said hood.

JACK P. WILSON.
HERBERT T. LEWIS, Jr.
DONALD C. GLASSFORD.

REFERENCES CITED

The following references are of record in the file of this patent:

UNITED STATES PATENTS

| Number | Name | Date |
|---|---|---|
| 61,627 | Matthews, Jr. | Jan. 29, 1867 |
| 615,050 | Salenius | Nov. 29, 1898 |
| 691,537 | Ericson | Jan. 21, 1902 |
| 714,875 | Doble | Dec. 2, 1902 |
| 741,402 | Holderman | Oct. 15, 1903 |
| 774,349 | Cassel | Nov. 8, 1904 |
| 905,017 | Storck et al. | Nov. 24, 1908 |
| 987,892 | Lane | Mar. 28, 1911 |
| 1,044,074 | Nugent | Nov. 12, 1912 |
| 1,062,741 | Sieber | May 27, 1913 |
| 1,097,084 | Eichelberger | May 19, 1914 |
| 1,337,490 | Summer | Apr. 20, 1920 |
| 1,345,380 | McColl et al. | July 6, 1920 |
| 1,372,009 | Davidson et al. | Mar. 22, 1921 |
| 1,420,637 | Madden et al. | June 27, 1922 |
| 1,578,036 | Johnson | Mar. 23, 1926 |
| 1,633,459 | Schock | June 21, 1927 |
| 1,640,482 | Crumbaugh et al. | Aug. 30, 1927 |
| 1,681,181 | Fulton | Aug. 21, 1928 |
| 1,731,953 | Thomson | Oct. 15, 1929 |
| 2,010,239 | Martin | Aug. 6, 1935 |
| 2,125,860 | Sommer | Aug. 2, 1938 |
| 2,136,224 | Weinreich | Nov. 8, 1938 |
| 2,161,553 | Westberg et al. | June 6, 1939 |
| 2,355,848 | Clark | Aug. 15, 1944 |
| 2,364,415 | Arnold et al. | Dec. 5, 1944 |
| 2,387,452 | Lundal et al. | Oct. 23, 1945 |
| 2,394,737 | Allen | Feb. 12, 1946 |
| 2,428,598 | Weaver | Oct. 7, 1947 |

FOREIGN PATENTS

| Number | Country | Date |
|---|---|---|
| 57,803 | Norway | May 4, 1934 |
| 471,783 | Great Britain | Sept. 10, 1937 |
| 687,007 | France | Aug. 4, 1930 |